Oct. 30, 1951 D. GONDA 2,572,924
HOLLOW PLASTIC PRODUCT AND METHOD OF MAKING THE SAME
Filed July 7, 1948 3 Sheets-Sheet 2
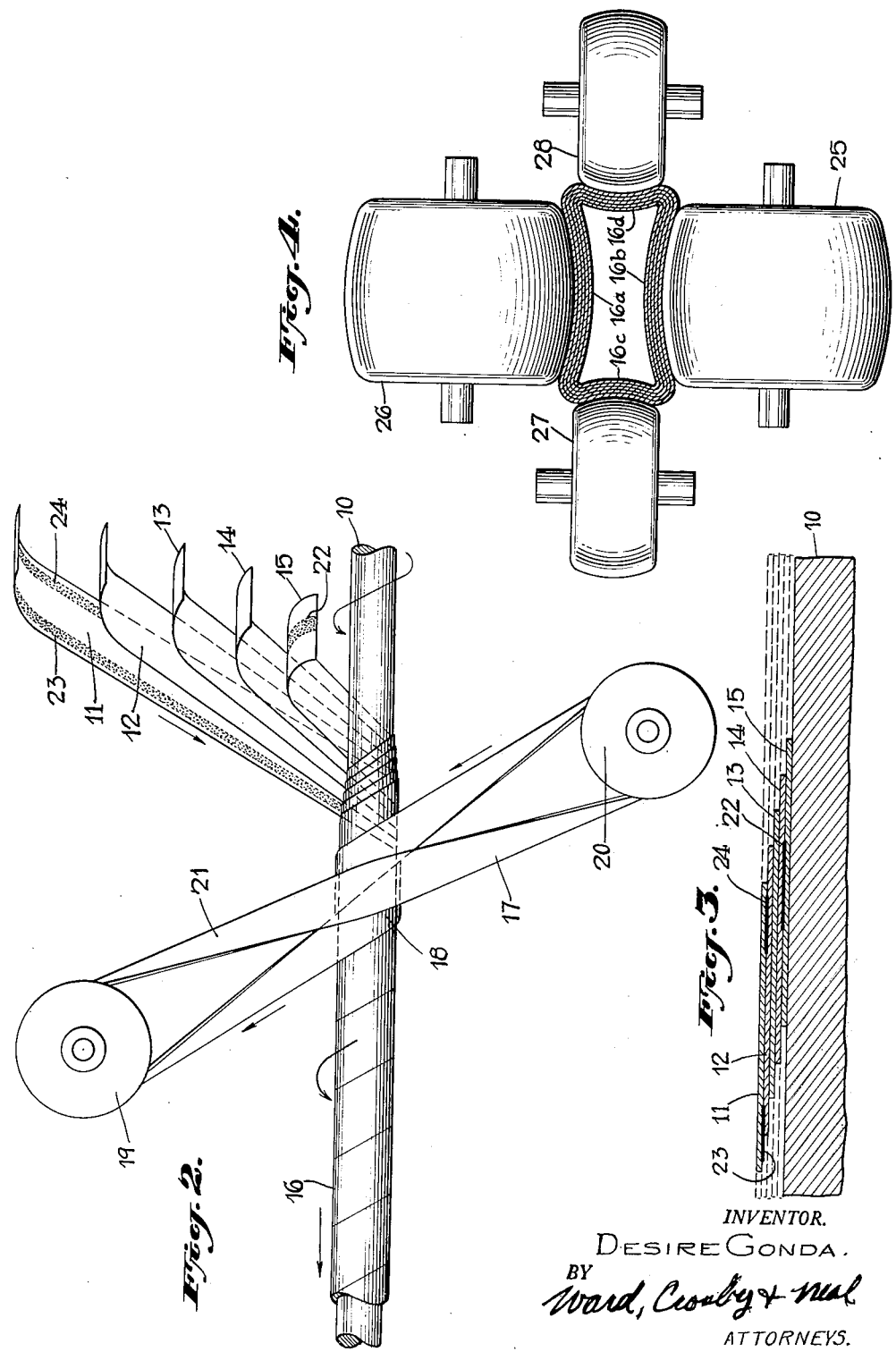
INVENTOR.
DESIRE GONDA.
BY
Ward, Crosby & Neal
ATTORNEYS.

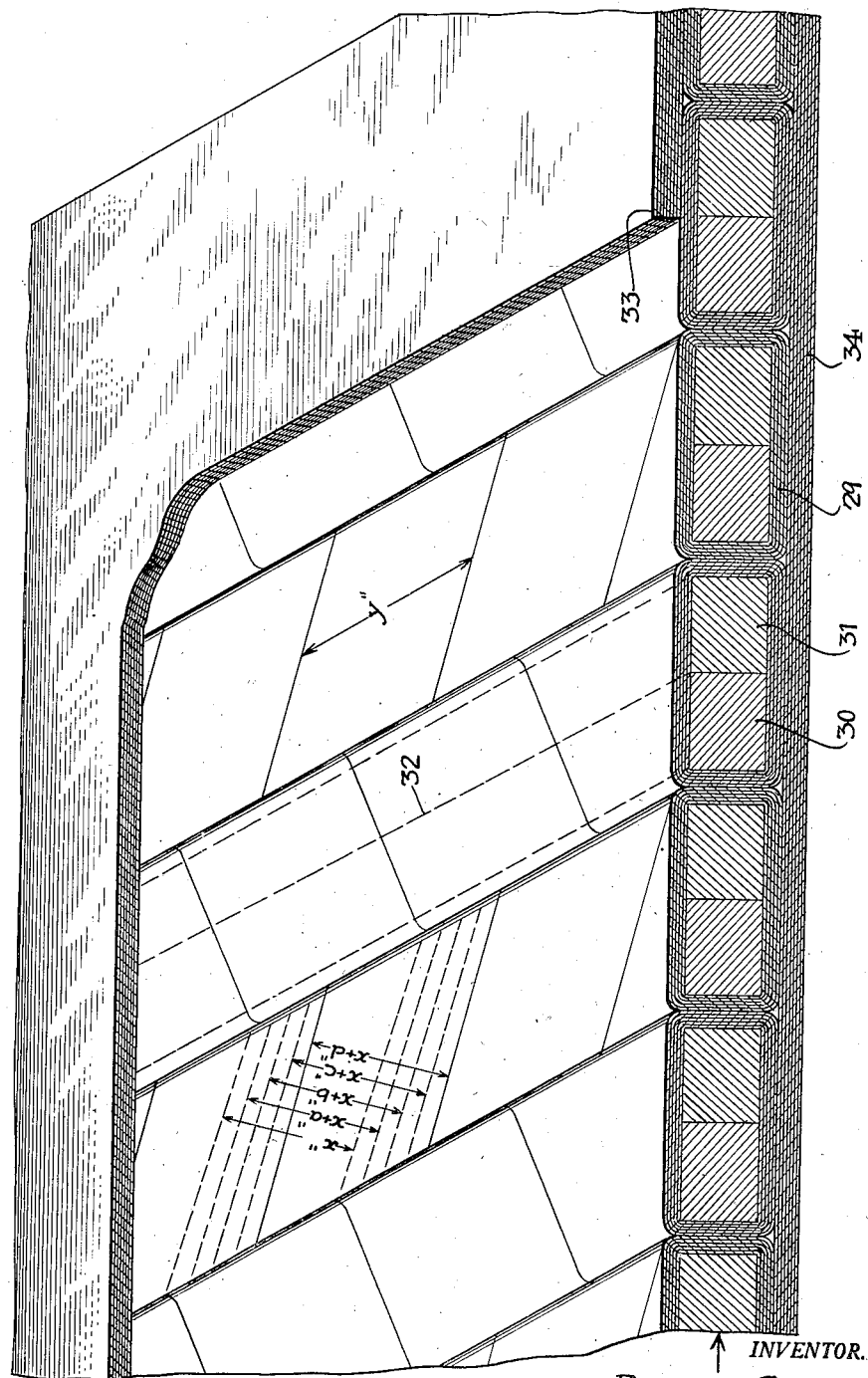

Oct. 30, 1951              D. GONDA              2,572,924
HOLLOW PLASTIC PRODUCT AND METHOD OF MAKING THE SAME
Filed July 7, 1948              3 Sheets—Sheet 3
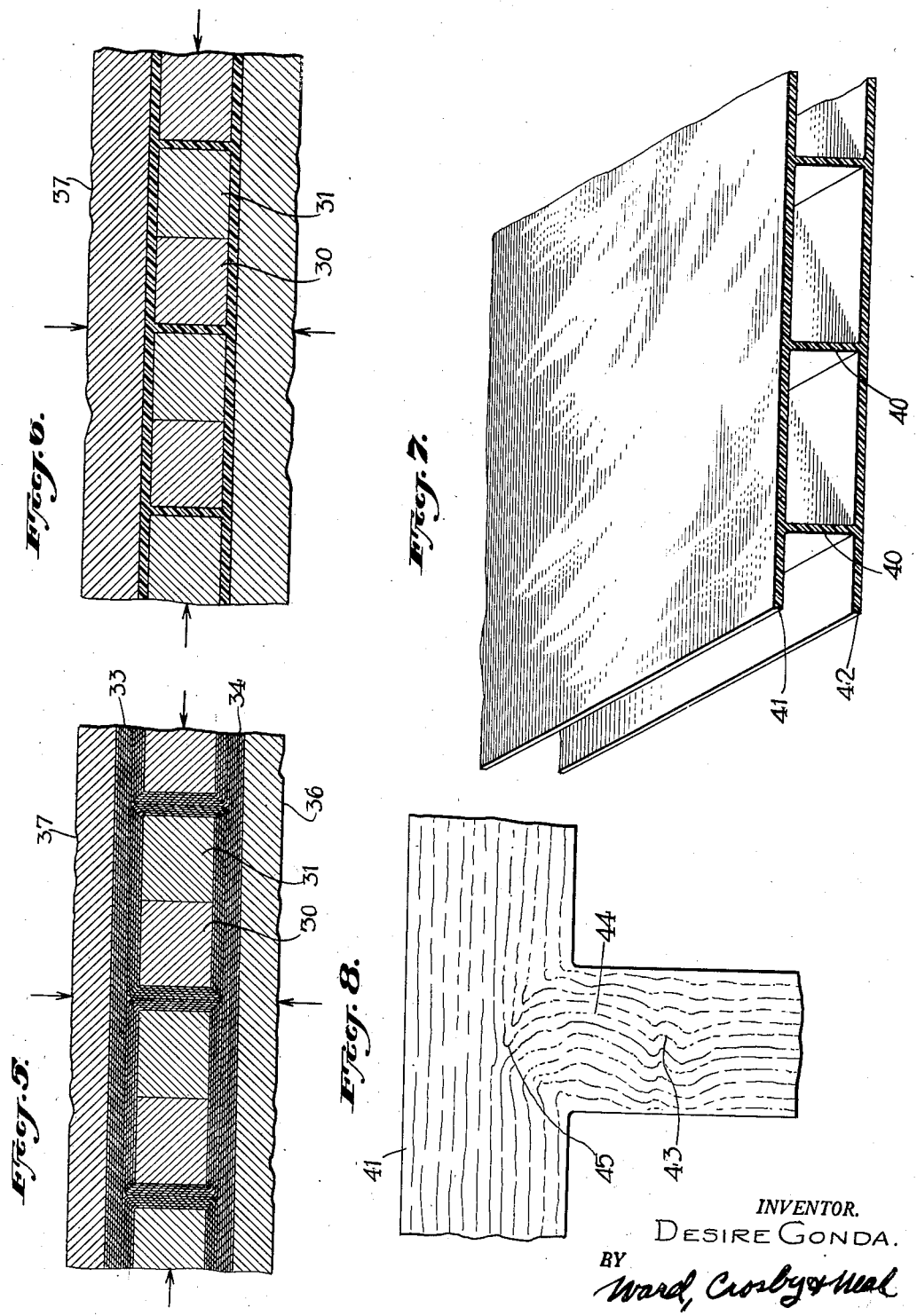
INVENTOR.
DESIRE GONDA.
BY
Ward, Crosby & Neal
ATTORNEYS.

Patented Oct. 30, 1951

2,572,924

UNITED STATES PATENT OFFICE 2,572,924

HOLLOW PLASTIC PRODUCT AND METHOD OF MAKING THE SAME

Desiré Gonda, Sittingbourne, Kent, England, assignor to Holoplast Limited, New Hythe, near Maidstone, England, a British company Application July 7, 1948, Serial No. 37,361

5 Claims. (Cl. 154—117)

This invention relates to improved laminated plastic structural units of the general type disclosed in my co-pending application Serial No. 579,429, filed February 23, 1945 (now Patent No. 2,445,290, granted July 13, 1948) and a division thereof, Serial No. 687,809, filed August 2, 1946, now abandoned, said application Serial No. 579,429 being in turn a division of my application Serial No. 424,090, filed December 22, 1941, now abandoned.

Said applications disclose laminated plastic structural units of various forms comprising spaced-apart panel-like portions interconnected by spaced webs, there being channel-like cavities between the webs, the laminae of the panel-like portions and webs being formed of fibrous sheet material impregnated, bonded and compacted together with thermosetting resin to provide an integral, rigid, hard structure. As disclosed in said applications, the impregnated laminae which surround each of the channels are formed as by winding a single sheet of a suitably impregnated paper, a plurality of times, straight around a mandrel assembly to form a multi-ply tube of the desired quadrilateral cross-section corresponding generally to the cross-section of the desired channels in the finished unit. These laminated tube and mandrel assemblies were then placed side by side between upper and lower pluralities of impregnated sheets to form an assembly which was subjected to heat and pressure, applied vertically and from the sides, to form the desired integral, rigid, compacted structure.

While the method above referred to for winding and forming the multi-ply tubes is satisfactory for producing a laminated plastic unit of unusually great strength, the features of the present invention include the provision of alternative embodiments having an improved helical winding formation of the tubes of such structures, and involving improved methods for forming the same.

If, according to the disclosures of my above mentioned co-pending applications, each of the tubes is formed by winding a single sheet of the impregnated fibrous material straight around a mandrel formation a plurality of times, it is somewhat difficult to insure that the inner and outer end edges of the sheet will fall along the same line, as is desirable to avoid any point along the tube which will have either a greater or lesser number of laminae than the remainder of the tube. Special care must also be taken that the outer end edge does not fall in a position such that it will cause a noticeable light reflecting ridge or depression on the polished surface of the finished unit after the resin is cured under heat and pressure. Also, this method of winding the tubes from the standpoint of convenience, speed and economy in manufacture, has some disadvantages in that if the laminate is of paper, and it is desired to have the direction of the fiber run longitudinally of the tube, as is preferred, then each tube must be wound from a separate sheet which has been cut from an elongated web of paper as manufactured, and thus the winding of each tube is an individual operation utilizing separate sheets, and the tubing cannot be wound as a continuous tubing and cut into lengths, since a sheet wider than the usual tube length cannot be readily manipulated to wind it a plurality of times around the mandrel structure.

According to the present invention, a continuous tube is formed by helically winding a plurality of relatively narrow ribbons of the impregnated fibrous sheet material about a mandrel, preferably of circular cross-section. Such tube is cut into lengths and shaped according to the desired quadrilateral cross-section of the cavities of the structural unit, and then the reshaped tubes with mandrels therein are arranged in an assembly which is treated in a manner similar to that above described. I have found, however, that the formation and use of the tubes in this way involves certain problems, the solution of which will be made apparent as the description of the invention proceeds.

Various further and more specific features and advantages of the invention will clearly appear from the detailed description given below, taken in connection with the accompanying drawings which form a part of this specification, and illustrate by way of example a preferred embodiment of the invention and the manner in which the invention may be carried out.

In the drawings:

Figure 1 is a perspective view, partially broken away, showing an assembly of the upper and lower impregnated sheets with the helically wound tubes containing mandrels positioned between such sheets, ready for the application of heat and pressure to produce the final product;

Fig. 2 is a somewhat schematic view showing the method of winding the tubes;

Fig. 3 is a longitudinal sectional view through a part of the side wall of one of the tubes just after being formed;

Fig. 4 is a view showing the apparatus and method by which the tubing is reshaped to provide the desired quadrilateral cross-sectional form;

Fig. 5 is a sectional view of an assembly such as shown in Fig. 1 at an intermediate stage during the treatment of same by heat and pressure;

Fig. 6 is a similar view showing the assembly after being subjected to pressure to bring the parts thereof to their final dimensions;

Fig. 7 is a perspective view of the finished product according to one embodiment of the invention; and Fig. 8 is a cross-sectional view greatly enlarged of a portion of the finished structure at the region of the juncture of one of the webs with the upper panel-like portion and indicating the manner in which the laminae within such region are irregularly bulged transversely of the web.

Reference will now be had to the drawings in further detail, and more particularly to Fig. 2 which indicates the method of forming the tube. A rigid mandrel of circular cross-section and preferably stationary is indicated at 10, about which a plurality of thermo-setting resin impregnated ribbons 11 to 15 inclusive are being helically wound in superposed relation so as continuously to form a multi-ply tube 16. These ribbons are formed of fibrous sheet material such as paper, preferably with the principal direction of the fibre running longitudinally of the ribbons. This tube, as formed, may be continuously rotated about the mandrel 10 and at the same time advanced along the mandrel to the left as indicated by the arrow, by means of a suitable belt 17, which is looped as at 18 about the finished tube, the belt being carried on suitably driven pulleys as at 19 and 20. When the belt is driven in the direction indicated by the arrows thereon, the loop 18 frictionally engages progressively advancing portions of the tube 16, thereby causing the tube to rotate and advance at the proper speed to cause the ribbons 11-15 to be wound into place. The inactive return belt stretch between pulleys 19 and 20 is indicated at 21.

It is important that the superposed ribbons be wrapped about the mandrel firmly to avoid cavities therebetween, and since the tightly fitting tube as rotated and advanced along the mandrel will tend to cause considerable heat-producing friction therewith, it is desirable that the mandrel be highly polished and that a suitable lubricant be applied thereto, of such a nature as not to be injurious to the thermo-setting resin impregnation of the ribbons. Otherwise some of the resin impregnation may become partially and prematurely cured by the heat before the tubing is ready for use. A small amount of stearine, for example, may be used as the lubricant if a phenol formaldehyde resin impregnation is used for the ribbons.

I have further found it to be important that the ribbons be so wound in place that the edges of adjacent turns of each ribbon will come together accurately with a close butt joint, that is, without any gap between the turns and without any overlapping of one turn upon the next turn of the same ribbon. Otherwise after the final assembled unit is cured under heat and pressure, herringbone-like lines may appear on the surfaces of the unit, particularly if such surfaces, as finished, are glossy or polished so that even the slightest ridge or depression will be apparent with reflected light. For similar reasons, it is important that the helical butt joints of successive superposed ribbons be spaced apart longitudinally of the tubing so that there will be no superposed butt joint crevices through which the resin may flow out of proper position during the curing operation  However, since the turns of the inner ribbons are of slightly lesser diameters than the turns of the outermost ribbons as wound onto the mandrel 10, if all of the ribbons were of the same width, because of the greater areas of the outer ribbons, certain of the helical butt joints would gradually advance in position with respect to the other butt joints, and consequently, with the tube being continuously formed, the butt joints of the several layers at intervals along the tube would come into the undesired superposed positions of register. I have found that this difficulty may be conveniently avoided by forming the successive outer ribbons with progressively slightly greater widths. For example, assuming that the internal diameter of the tube is 1⅝ inches, then the inner ribbon 15 may conveniently be 2 inches wide and the outer ribbon 11, 2¼ inches wides, the intermediate ribbons being of intermediate widths accordingly. The manner in which the butt joints of the superposed ribbons respectively will then be spaced apart, is indicated on one of the tubes shown in Fig. 1. Here the width of the inner ribbon, indicated by dotted lines, is denoted as $x$ inches, the widths of the successive overlying ribbons being denoted as $x+a$ inches, $x+b$ inches, etc. Expressed otherwise, the outer ribbons are made wider and wider respectively to an extent sufficiently to compensate for the slightly greater and greater areas of the windings formed by each.

As indicated by the butt joints shown in dotted lines in Fig. 1, as well as by the manner in which the ribbons are led onto the mandrel 10 in Fig. 2, the turns of the inner ribbons are positioned at slightly smaller and smaller angles respectively with respect to the tube axis. However, the pitch of the butt joints, as indicated at Y on one of the tubes in Fig. 1, is made the same and uniform for all the layers.

While the ribbons 11-15 are impregnated with thermo-setting resin, it is desirable that such resin will ordinarily not be in adhesive condition during the winding and should not be brought into such condition at this stage to rely upon it as the means for temporarily adhering the layers of the tubing together. At the same time, no adhesive for this purpose should be used if it is of such a nature as to form a film through which the resin will not penetrate during the final curing of the structural unit, and thus cause weakening of the regions between the laminae of the finished structure due to the prevention of effective bonding by any such adhesive. I have found, however, that if a small amount of a good grade of animal glue, such as Scotch glue is applied along a central band as at 22 on the outer surface of the inner ribbon 15 and along bands as at 23 and 24 on the inner surface of the outer ribbon 11, such adhesive will secure the plies of the tube together adequately for carrying out the invention. And when the assembled structural unit is cured under heat and pressure, such glue will disintegrate, disappear or disperse and in no way interfere with the proper bonding action of phenol formaldehyde thermo-setting resin along the bands at which such adhesive was applied. Ordinary Scotch glue embodying about 50% water may be used, and if desired containing 5 to 10% of a formaldehyde solution (66% $H_2O$) to accelerate the setting so that the glue will become quite tacky substantially immediately upon the forming of the tube. During the final curing of the structural assembly under heat and pressure, the water content of this adhesive will vaporize, and during the normal "breathing" of the press during the curing operation, such moisture will escape from the assembly, and the remainder of the constituents of the adhesive will disintegrate or disperse and disappear. The adhesive should be applied to the ribbons as shown in Fig. 2 in thin layers, preferably at an elevated temperature of from 160 to 180° F. Instead of glue adhesive as the adhesive for this purpose, one may use a suitable water-soluble phenol formaldehyde resin, although same will require a somewhat longer period to set adequately. In case the laminae of the structural unit are impregnated with a melamine resin, one may use a melamine type of adhesive for this purpose.

As indicated in Fig. 2, it has been found that a single narrow band 22 of the adhesive satisfactorily retains the inner ply ribbon 15 against curling or other displacement into the cavity of the tube, whereas on the inside of the outer ply, the two bands 23, 24 of adhesive, located respectively in positions spaced from the edges of the ribbon, it will be adequate to secure the outer part of the tubing against unwinding or curling of the outer ribbon, and at the same time leave the outer surface of the tube free of adhesive. The positions in which these lines of adhesive occur in the wound tube, and the relationship of the butt joints of successive plies, will be apparent from Fig. 3.

As the tube 16 progresses continuously from the left hand end of the mandrel 10 as viewed in Fig. 2, it may be sawed off by suitable known equipment into lengths depending upon the dimensions of the desired structural units. These lengths are then fed between two pairs of rollers 25, 26 and 27, 28, as shown in Fig. 4, which act to reform the tubes to a quadrilateral cross-sectional form by shaping same to have four longitudinally extending wall portions 16a—16d inclusive which are initially bulged inwardly, but which, after passage from the rollers, spring out to generally correspond to the desired quadrilateral cross-sectional shape of the channels in the finished structural unit. That is, as shown in Fig. 4, the annular surface of each of the rollers has a somewhat rounded cross-section causing four inward bulges to occur in the tubing temporarily, such bulges being sufficiently deep so that after the tubing leaves the rollers, these four walls will spring outwardly but only to a substantially flattened condition, without reverting to the original circular form.

As a next operation, a pair of steel mandrels as at 30, 31 (Fig. 1) are fitted into each of the tubes, these mandrels, at the surfaces which contact each other, being formed with complementary tapers as indicated by the dotted line 32, so that the mandrel 30 may be inserted and later pulled out at the front edge of the assembly as viewed in Fig. 1, and the mandrel 31 may be similarly inserted and later pulled out from the rear edge of the assembly.

The tubes with the mandrels therein are next placed in side-by-side relation, as indicated in Fig. 1, in assembly with upper and lower spaced pluralities of thermo-setting resin-impregnated fibrous sheets 33, 34, which are to form the outer thicknesses of the panel-like portions of the finished assembly.

If the tubes 29 are assembled side by side in a manner so that all of the helical ribbon windings are wound in the same direction, then upon curing the assembly under heat and pressure, the stresses resulting from such windings in the relatively rigid hard finished unit, will be such as to cause serious warpage upon removing the units from the press. For example, if the unit is several feet long and several feet wide, it will be found that such warpage is so serious that one corner will be twisted out of the plane of the diagonally opposite corner by as much as 1 to 1½ inches. I have found, however, that this difficulty may be completely overcome by interspacing tubes of one group wound in one direction with tubes of another group wound in the opposite direction, as is shown in Fig. 1. In this way the warpage stresses established in the oppositely wound tubes respectively, effectively compensate for each other, and the unit is held probably with even more firmness against warping at any part thereof from its desired plane, than if no such stresses occurred therein. Due to the divergent directions of the fibre in the oppositely wound tubes, the structure is also considerably strengthened. The windings of opposite direction in adjacent tubes also insure that the helical butt joints on one tube will at no time come in register with the helical joints in or on the adjacent tubes. Although it is preferred to have each alternate tube oppositely wound, satisfactory results for some purposes may be obtained by interspacing pairs or groups of tubes (those of each pair or group being wound in the same direction but opposite to that of adjacent pairs or groups) so long as the winding stresses of one group are substantially counteracted by the stresses of adjacent groups.

After the assembly is arranged as in Fig. 1, pressure may be applied sideways to the tubes with the mandrels therein in the direction indicated by the arrow at the left hand side of Fig. 1, to bring the tube side surfaces into firm abutting relation. The assembly may then be placed in a hydraulic press between heated platens, as indicated at 36 and 37, in Fig. 5. After the assembly has been brought under pressure applied sideways and then also vertically, and to a sufficient temperature to cause the resin impregnation to flow, pressure may be applied in two or more further stages between "breathing" operations of the press, to bring both the webs and the spaced-apart panel portions of the unit to the finally desired cross-sectional dimensions as shown in Fig. 6. Fig. 7 shows the appearance of the finished unit after removal from the press, the webs being indicated at 40 and the upper and lower spaced-apart panel-like portions respectively being indicated at 41, 42.

In the pressing operations, pressure is applied first edgewise to the assembly of tubes with the mandrels therein, so that these slide inwardly somewhat with respect to the upper and lower laminae 33, 34, which laminae remain in substantially flat condition. Then, when the vertical pressure is applied to the latter, the webs are deliberately compressed vertically to a sufficient extent so that in the region as shown in Fig. 8 where the webs join the upper and lower panels, the laminae therein will be irregularly bulged transversely of the webs as at 43, 44, 45, thereby in effect forming interlocking ribs between each bonded pair of tubular portions. That is, the tubular laminated portions as bonded to and between the upper and lower flat laminae, will be interlocked against any forces tending to shear apart the unit along lines between one laminated tube and the next. Thus the strength of the resulting structure is substantially maintained or increased at the junctures of the tubular laminated portions despite the fact that the upper and lower pluralities of flat laminae are the only ones which extend straight across these portions.

The upper and lower surfaces of the structural unit may, if desired, be finished in the various ways disclosed in my above-mentioned application Serial No. 579,429, reference to which is hereby also made as to various further procedural and constructional details and possible compositions and materials to be used.

While the invention has been described in detail with respect to particular preferred examples, it will be understood by those skilled in the art after understanding the invention that various changes and modifications may be made without departing from the spirit and scope of the invention, and it is intended therefore in the appended claims to cover such changes and modifications.

I claim:

1. A structural panel unit comprising in combination, spaced substantially parallel top and bottom sheets, a plurality of tubular members of quadrilateral cross-sectional shape arranged side by side with their upper and lower surfaces respectively abutting said top and bottom sheets and with each side surface of each tubular member abutting a side surface of an adjacent tubular member to form conjointly therewith a web interconnecting said top and bottom sheets, said sheets and said tubular members being comprised of superposed laminae of fibrous sheet material impregnated and bonded together with thermo-set resin, such resin bonding said sheets respectively to the top and bottom surfaces of said members and also bonding the web forming side surfaces of adjacent members together all as an integral rigid hard compacted structure with channels therein defined by said tubular members, the laminae of said tubular members comprising helically wound ribbons of said fibrous material, the helical windings of a plurality of the tubular members being all in one direction, the members thus wound being interspaced with another plurality all wound in the opposite direction, whereby stresses resulting from the helical form of said first plurality and which tend to warp the panel unit are substantially counteracted by similar stresses resulting from the helical form of said other plurality.

2. A structural unit in the form of spaced apart top and bottom panel-like portions interconnected by spaced webs with channels therebetween defined by said webs and panel-like portions, said portions and webs being comprised of superposed laminae of fibrous sheet material impregnated, bonded and compacted together with thermo-set resin, all as an integral, rigid, hard structure, a plurality of the laminae surrounding each of said channels comprising superposed helical windings of said fibrous material in ribbon-like form, and the windings which surround each alternate channel being wound in a direction opposite from the direction of the windings of the intermediate channels.

3. A structural unit in the form of spaced apart top and bottom panel-like portions interconnected by spaced webs with channels therebetween defined by said webs and panel-like portions, said portions and webs being comprised of superposed laminae of fibrous sheet material impregnated, bonded and solidly compacted together with thermo-set resin, all as an integral, rigid, hard structure, a plurality of the laminae surrounding each of said channels being in the form of superposed helical windings which, about each channel are all wound in the same direction but are wound in opposite directions about successive channels and are formed of separate ribbons of said fibrous material, the edges of the successive turns of each ribbon coming together as a butt joint which extends helically around the channel, and the butt joints of successive layers about each channel at all points being spaced apart in the direction of the axis of the channel.

4. A structural unit in the form of spaced apart top and bottom panel-like portions interconnected by spaced webs with channels therebetween defined by said webs and panel-like portions, said portions and webs being comprised of superposed laminae of fibrous sheet material impregnated, bonded and solidly compacted together with thermo-set resin, all as an integral, rigid, hard structure, a plurality of the laminae surrounding each of said channels being in the form of superposed helical windings of separate ribbons of said fibrous material, the edges of the successive turns of each ribbon coming together as a butt joint which extends helically around the channel, the ribbons of successive overlying windings each being wider than the ribbon of the next underlying winding by an amount substantially to compensate for the greater area of the overlying winding, the windings being all of substantially the same pitch, and the butt joints of successive windings being spaced apart axially of the channel.

5. In a method of producing a structural unit in the form of panel-like portions interconnected by spaced webs with channels therebetween defined by said webs and panel-like portions: the combination of steps which comprises forming two groups of like multi-ply tubes by winding generally helically, ribbons of fibrous sheet material impregnated with thermosetting resin, the plies of one group however being all wound in one direction and the plies of the other group being all wound in the opposite direction; arranging said tubes in side by side relation with a plurality of plies of thermosetting resin impregnated fibrous sheet material both above and below, the tubes of one group being interspaced with the tubes of the other group; and then subjecting the resulting assembly to high pressure and heat to set the thermosetting resin thereof so as to form the assembly into an integral rigid plastic unit while supporting the tube walls interiorly.

DESIRÉ GONDA.

REFERENCES CITED

The following references are of record in the file of this patent:

UNITED STATES PATENTS

| Number | Name | Date |
|---|---|---|
| 1,158,667 | Fairchild | Nov. 2, 1915 |
| 1,284,363 | Kempton | Nov. 12, 1918 |
| 1,287,945 | Ford | Dec. 17, 1918 |
| 1,855,161 | Wyman | Apr. 19, 1932 |
| 1,915,626 | Spohn | June 27, 1933 |
| 2,029,048 | Atwood | Jan. 28, 1936 |
| 2,300,760 | Amigo | Nov. 3, 1942 |
| 2,369,006 | Banks | Feb. 6, 1945 |
| 2,385,352 | Davis | Sept. 25, 1945 |
| 2,399,124 | Kahr | Apr. 23, 1946 |
| 2,405,909 | Smith et al. | Aug. 13, 1946 |
| 2,445,290 | Gonda | July 13, 1948 |

FOREIGN PATENTS

| Number | Country | Date |
|---|---|---|
| 865,382 | France | May 21, 1941 |